United States Patent [19]
Fukuda et al.

[11] Patent Number: 5,644,670
[45] Date of Patent: Jul. 1, 1997

[54] BROAD BANDWIDTH OPTICAL FIBERS, JACKETED OPTICAL FIBERS AND OPTICAL FIBER CORDS

[75] Inventors: Seiji Fukuda, Tokyo; Hisaaki Kobayashi, Nishikasugai-gun; Shoshiro Taneichi, Tajimi; Tetsuya Yamamoto, Nagoya, all of Japan

[73] Assignee: Toray Industries, Inc., Japan

[21] Appl. No.: 637,806

[22] PCT Filed: Sep. 13, 1995

[86] PCT No.: PCT/JP95/01826

§ 371 Date: May 8, 1996

§ 102(e) Date: May 8, 1996

[87] PCT Pub. No.: WO96/08741

PCT Pub. Date: Mar. 21, 1996

[30] Foreign Application Priority Data

Sep. 16, 1994 [JP] Japan ................... 6-221244

[51] Int. Cl.$^6$ ................... G02B 6/132; G02B 6/16
[52] U.S. Cl. ................... 385/124; 385/145; 385/128
[58] Field of Search ................... 385/124, 128, 385/145

[56] References Cited

U.S. PATENT DOCUMENTS

| | | | |
|---|---|---|---|
| 4,482,204 | 11/1984 | Blyer, Jr. et al. | 385/128 |
| 4,690,503 | 9/1987 | Janssen et al. | 385/128 |
| 4,877,306 | 10/1989 | Kar | 385/128 |
| 5,062,685 | 11/1991 | Cain et al. | 385/128 |
| 5,123,076 | 6/1992 | Nishimoto et al. | 385/124 |

*Primary Examiner*—John D. Lee
*Assistant Examiner*—Ellen Eunjoo Kang
*Attorney, Agent, or Firm*—Austin R. Miller

[57] ABSTRACT

This invention discloses broad bandwidth optical fibers which have a broad bandwidth suitable for data-communication, are free from fiber cracking or chipping if a crimp-type connector is attached with sufficient pulling resistant force to hold the fiber firmly, minimize the connection loss through a small crimping optical loss and a accurate axial alignment, facilitate connection with existing GI quartz optical fibers, which have a fiber diameter of 125 μm, and offer excellent compatibility with such existing GI quartz optical fibers. Broad bandwidth optical fibers pertaining to this invention are graded index broad bandwidth optical fibers fabricated from a core made of quartz-based glass with a graded refractive index profile, a quartz glass cladding provided over said core, and polymer covering layer provided over said cladding, with said polymer covering layer made of a UV-cured hard polymer with a Shore hardness of D 55 or more and a thickness of 5 μm or more. Jacketed optical fiber units are then produced by providing a primary coating over an optical fiber and a secondary coating over a primary-coated optical fiber or fibers. Finally optical fiber cords are produced by providing a polymer sheath around a jacketed optical fiber unit.

17 Claims, 2 Drawing Sheets

BROAD BANDWIDTH OPTICAL FIBERS, JACKETED OPTICAL FIBERS AND OPTICAL FIBER CORDS

TECHNOLOGICAL AREA

This invention relates to graded index broadband optical fibers suitable for light transmission in various data communication areas involving voice, image, text, etc. because of their high-speed signal transmission capabilities, as well as secondary-coated optical fiber units and optical fiber cords based on them.

CONVENTIONAL TECHNOLOGIES

Among telecommunications optical fibers designed for the establishment of high-speed, high-capacity data links are quartz multi-mode optical fibers and quartz single-mode optical fibers which use quartz glass in their cores and cladding, and their technical requirements are laid out in JIS (Japanese Industrial Standards) C 6832, 6835 and 6831. Jacketed optical fiber units based on them incorporate an optical fiber or fibers, each provided with a primary coating, made of an ultraviolet (UV) cured resin or silicone resin and surrounding the quartz glass claddings, and a secondary coating, made of polyamide resin or the like and surrounding it/them.

Apart from quartz single-mode optical fibers, only graded index quartz multi-mode optical fibers (hereinafter referred to as GI quartz optical fibers) are capable of high-speed optical signal transmission (e.g. those with a bandwidth of 200 MHz×km or more). With GI quartz optical fibers, the refractive index profile of the core is optimized to minimize mode dispersion, which is a transmission bandwidth limiting factor, with the core diameter normally set in the 50–100 μm range (particularly 50 μm and 62.5 μm).

Since the cores and claddings of GI quartz optical fibers are made of quartz glass, attaching a crimp-type connector by crimping after the removal of the primary and secondary coatings, which are made of polymers, causes them to crack or chip. Also, if a crimp-type connector is attached by crimping without removing the primary and secondary coatings, axial misalignment results, causing a large optical connection loss, which makes this method practically unusable.

Conventionally, therefore, it was necessary to use an adhesive-type connector, in which the fiber is fixed at its center by means of a thermosetting, UV-cured, thermoplastic or two-part adhesive agent after removing the primary and secondary coatings, made of polymers, to avoid the above problems.

However, adhesive-type connectors take a long time to install and are therefore undesirable in terms of cost and labor.

In this respect, crimp-type connectors are advantageous as they can be installed far more easily and quickly than adhesive-type connectors, and are widely used for polymer cladding quartz optical fibers (hereinafter referred to as PCFs) and plastic optical fibers.

A PCF consists of a quartz glass core and plastic cladding, with a large core diameter, usually 200 μm or more, and has a narrow bandwidth compared to a GI quartz optical fiber, which has a quartz glass cladding. Although a version of PCF with a graded index core (i.e. GI fiber) exists (Japanese Laid-open Patent No. 3-245108 (1991), its bandwidth, which is only in the 60–90 MHz*km range, is inadequate.

Although a PCF is advantageous in that it allows the use of a crimp-type connector, it is associated with the problem of inadequate transmission distance in, for example, applications involving FDDI (Fiber Distributed Data Interface), an optical fiber based computer communication standard, due to its narrow bandwidth.

Also, a method of utilizing a crimp-type connector for a quartz optical fiber by providing a cover made of a rigid polymer called thermoplastic fluoroacrylate resin, which has a Shore hardness of D 65 or more, over the quartz fiber cladding has been proposed in the Japanese Laid-open Patent No. 2-151821 (1990).

Although this method is fairly effective for optical fibers with a cladding diameter of 125 μm and a rigid polymer covering layer diameter of 140 μm or more, problems remain in that such large diameters make connection with existing GI quartz optical fibers, which conform to a standard optical fiber diameter of 125±3 μm, as well as maintaining compatibility with them, difficult.

Transmission loss of Optical fibers With a hard resin covering layer of 140 μm or more in diameter shown in the above patent can achieve performance levels comparable to those of existing 125 μm GI quartz optical fibers, although is higher. However, as the thickness of the cladding is reduced to bring the diameter of the hard resin covering layer to 125±3 μm, problems such as rapid deterioration in transmission loss arise, making its practical application difficult.

This has given rise to the need to reduce the diameter of this hard resin covering layer to the same level as the standard outer diameter of a GI quartz optical fiber, 125±3 μm or less, while minimizing deterioration in transmission loss and eliminating fiber cracking or chipping attributable to crimp-type connector mounting, as well as increasing fiber pulling resistant force and reducing crimping loss.

DISCLOSURE OF INVENTION

The main object of the present invention is therefore to offer broad bandwidth optical fibers which have bandwidths suitable for telecommunications, are able to withstand the pulling resistant force necessary to attach a crimp-type connector firmly without developing cracking or chipping, minimize the connection loss through a low crimping loss and a high axial alignment accuracy, facilitate connection with existing GI quartz optical fibers, which have a fiber diameter of 125 μm, and maintain excellent compatibility with them, thus overcoming the shortcomings of conventional technologies.

For this reason broad bandwidth optical fibers pertaining to the present invention are graded index optical fibers consisting of a graded index quartz glass core, a quartz glass cladding provided over said core and a polymer covering layer provided over said cladding. Said polymer covering layer is a UV-cured rigid polymer with a Shore hardness of D 55 or more and thickness of 5 μm or more, and this is particularly effective in keeping the fiber outer diameter 128 μm or less. (up to 125±3 μm).

Preferably, the rigid polymer comprising this polymer covering layer is a UV-cured acrylate resin containing no fluorine with a refractive index of 1.50 or more.

Jacketed broad bandwidth optical fiber units pertaining to the present invention consist of an optical fiber or fibers, each provided with a primary coating, including one or more layers with at least the innermost layer formed of a soft polymer and surrounding the polymer covering layer of said broad bandwidth optical fiber, and a secondary coating provided over them.

Broad bandwidth optical fiber cords pertaining to the present invention feature a polymer sheath provided around said jacketed broad bandwidth optical fiber unit.

Connector-attached jacketed optical fibers and connector-attached optical fiber cords pertaining to this invention are said jacketed broad bandwidth optical fibers and broad band optical fiber cords provided with a crimp-type connector at one or both ends in such a manner that both primary and secondary coatings, as well as the polymer sheath in the case of the fiber cord, are removed, while keeping the polymer covering layer intact.

In the present invention, an optical fiber consisting of a glass core, glass cladding and a hard polymer covering layer, which is provided over the cladding, is referred to as a bare optical fiber (or simply an optical fiber), since it is treated in the same manner as a conventional bare optical fiber, which consists only of a glass core and glass cladding. A jacketed optical fiber unit is produced by providing a secondary coating over one or more primary-coated optical fibers, each consisting of a bare optical fiber and a primary coating provided over it. An optical fiber cord is produced from this jacketed optical fiber by further providing a polymer sheath over it so as to increase tensile strength, with high tensile materials also inserted as necessary.

With the present invention, it is possible to achieve excellent transmission loss and bandwidth characteristics even if the diameter of a bare GI quartz optical fiber provided with a polymer covering layer is reduced to 128 μm or less, and prevent fiber cracking or chipping if a crimp-type connector is attached by crimping using the necessary pressure to obtain a firm grip, while minimizing the connection loss through a low crimping loss and a high axial alignment accuracy.

This makes it possible to use a crimp-type connector for a GI quartz broad bandwidth optical fiber (jacketed fiber, cord), without adversely affecting the optical fiber characteristics.

Connector-attached jacketed optical fibers and optical fiber cords with excellent characteristics can be produced from bare fibers with the same outside diameter as existing standardized GI quartz optical fibers, thus making connection with such GI quartz optical fibers easy, as well as providing excellent compatibility with them.

Figure 1:
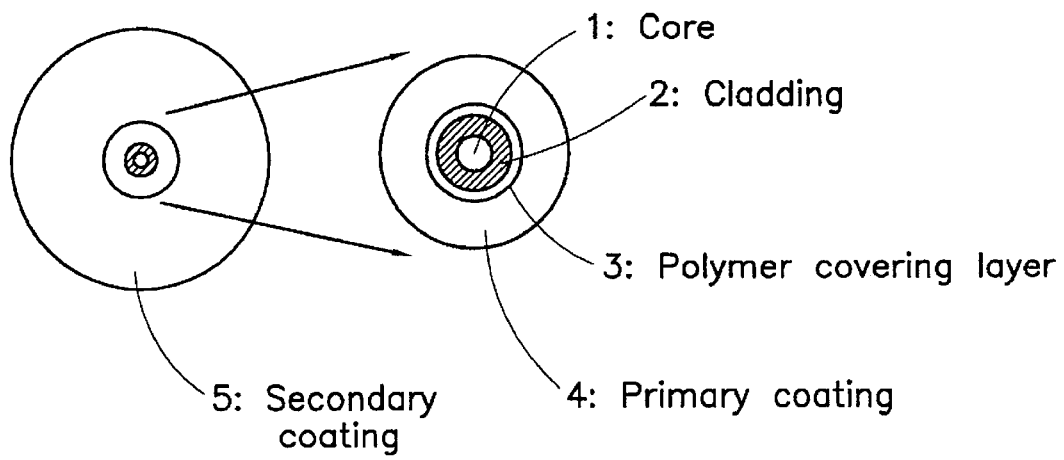
FIG. 1 is a cross-sectional view illustrating a typical jacketed graded index broad bandwidth optical fiber unit pertaining to this invention.
Figure 2:
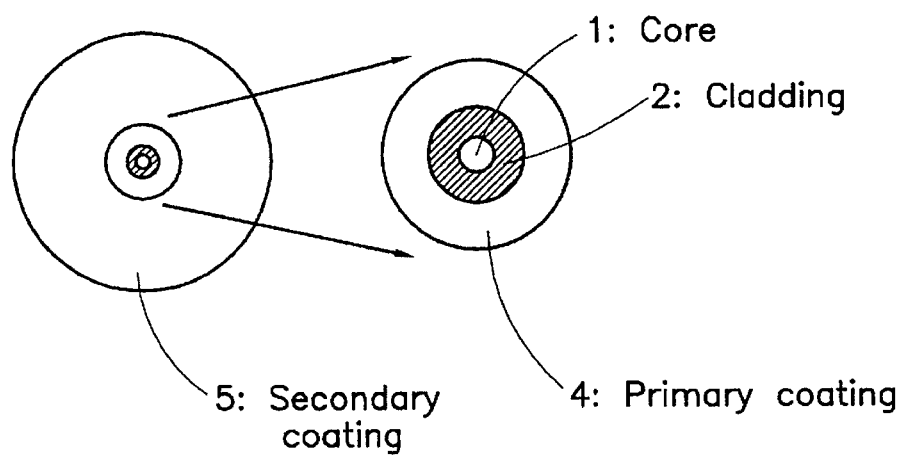
FIG. 2 is a cross-sectional view illustrating a conventional jacketed GI quartz optical fiber unit.

In these drawings, symbols 1–5, A and B stand for the following:

1: Core made of quartz glass with a graded index profile; 2: Cladding made of quartz glass; 3: Polymer covering layer made of hard polymer; 4: Primary coating; 5: Secondary coating; A: Working Example 7; B: Comparative Example 6

BEST MODES OF PRACTICING INVENTION

In the present invention, the core, which is located at the center of an optical fiber and confines and transmits the incident light beam, is made of quartz glass and has a graded index profile created by means of a dopant. The cladding, which surrounds the core, has a lower refractive index and is made of quartz glass. The cladding diameter refers to the diameter of a circle that best approximates the outer boundary of the cladding, and the core diameter refers to the diameter of a circle that best approximates the boundary of the core region, which is the portion of the optical fiber where the refractive index 'n' lies in the following range:

$$n_1 \geq n \geq n_2 + 0.05 \times (n_1 - n_2),$$

where n1=the maximum refractive index of the core; n2=the refractive index of the cladding.

Such an optical fiber, consisting of a graded index profile quartz glass core and a quartz glass cladding, can be produced by hot-drawing a quartz glass rod preform with the desired refractive index profile. The quartz glass rod preform can be manufactured by subjecting the main glass raw material consisting of silicon compounds to vapor phase reaction with a glass doping agent made of germanium compounds, and various manufacturing techniques, including vapor phase axial deposition, exist, with no particular restrictions applying in this respect, as long as a suitable refractive index profile and low loss can be obtained. For example, methods shown in Japanese Patent Publication Nos. 56-31291 (1981), 56-33327 (1981), 58-44619 (1983), 59-6260 (1984), 59-13451 (1984), 59-27728 (1984), and Japanese Laid-open Patent No. 62-123038 (1987) are acceptable.

Preferably, quartz glass cores pertaining to the present invention have their refractive index profile parameter "a" in the 1.8–2.2 range to achieve a signal transmission bandwidth of 150 MHz*km, with the 1.9–2.1 range particularly desirable to obtain a wider signal transmission bandwidth.

Preferably, core diameters pertaining to the present invention are 65.5 μm or less in view of ensuring consistency and compatibility with existing GI quartz optical fibers, with 50±3 μm or 62.5±3 μm particularly desirable. It is preferable that cladding diameters be 118 μm or less in view of keeping the outer diameter and thickness of the polymer cover at prescribed values, with 97–118 μm particularly desirable.

Preferably, the numerical aperture (NA) of an optical fiber, which is calculated from the maximum refractive index of the core and the refractive index of the cladding using the formula below, is 0.30 or less, particularly 0.18–0.29, to obtain an adequate broad bandwidth.

$$NA = (n_1^2 - n_2^2)^{1/2},$$

where n1: maximum refractive index of the core; n2: refractive index of the cladding.

Particularly, from the viewpoint of ensuring consistency and compatibility with existing GI quartz optical fibers, it is desirable that the numerical aperture be set at similar values to those specified in JIS (Japanese industrial Standards) C 6832 (i.e. NA=0.20±0.02, where core diameter/bare fiber diameter=50/125 μm; NA=0.275+0.015, where core diameter/bare fiber diameter=62.5/125 μm).

In the present invention, a polymer cover, made of a certain hard polymer, is formed over the cladding, and such a hard polymer needs to be a UV-cured resin with a Shore hardness of D 55 or greater, with the outer diameter of the polymer covering layer defined as the diameter of a circle that best approximates its outer boundary. On the other hand, a thermoplastic resin would need to be either hotmelting coated around the quartz glass cladding, or applied as a solution and dried. However, its adhesion to the cladding would be poor, so that control of the fiber diameter would be difficult, and there would also be other problems such as a large microbend loss, which would render it unusable. Besides, when a fiber was stress-ruptured, a mirror-finis, smooth rupture surface could not be obtained.

Among UV-cured resins, acrylate resins are preferable because of their high curing speeds, eliminating the need to reduce the drawing speed to adjust to the slow curing speed to ensure curing to the prescribed hardness.

Curable monomers (raw material) to produce UV-cured acrylate resins consist mainly of those containing acryloyl and/or methacryloyl groups, which have UV-curable double bonds, and can either be homogenous or heterogeneous, with no restrictions applying to the number of double bonds within a single molecule, as long as a Shore hardness of D 55 or greater can be obtained after curing. The monomers can also contain amide, imino, urethane, ester, ether, epoxy, hydroxyl, carbonate, ketone, sulfone, melamine and siloxane groups.

Resins can contain halogen atoms, although fluorine atoms are undesirable, as they tend to reduce the fiber pulling resistant force of a crimp-type connector and increase the loss attributable to connector mounticonnection ng as a result of reduced surface friction. It is particularly undesirable that the resin contain a large amount of fluorine, as this would reduce the refractive index, making it difficult to obtain the desired refractive index level. Furthermore, the hard polymer can contain a silane coupling agent capable of strengthening adhesion to the quartz cladding.

A high Shore hardness of D 55 or more is indispensable, as it helps minimize the connection loss associated with the installation of a crimp-type connector and axial misalignment of the core, as well as ensuring a clean and smooth cut surface or polished surface, in the case of cutting an optical fiber or polishing a cut surface.

Shore hardness D is a hardness reading obtained using the D method under ASTM-D2240, and the Shore hardness of the hard polymer can be measured by first producing a polymer plate specimen under the same curing conditions as applicable to the optical fiber production process, and then measuring the hardness of this polymer plate specimen using the above method.

Figure 3:
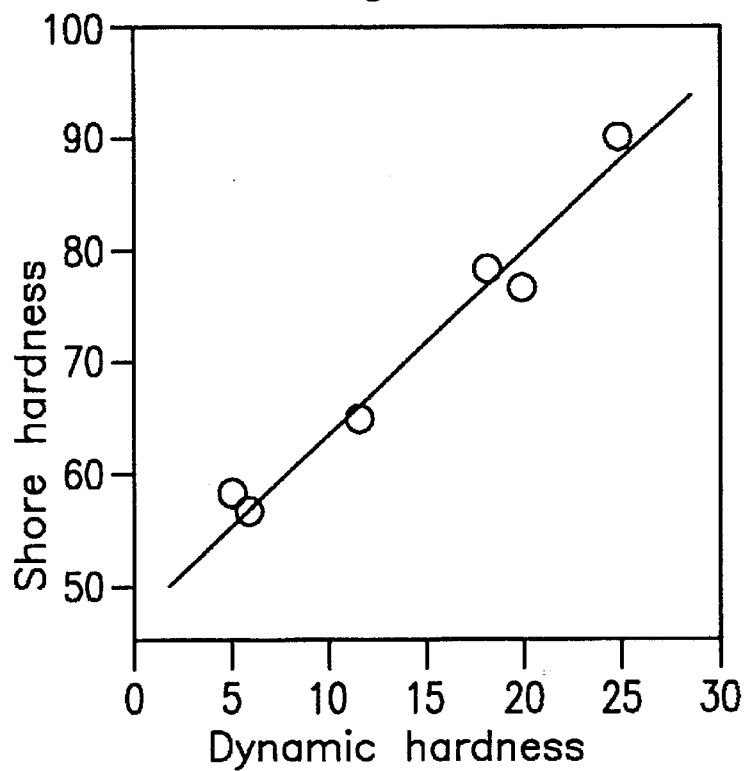
FIG. 3 shows the correlation between the Shore hardness and dynamic hardness of the hard polymer used as the polymer covering layer in the present invention.

In the case of a bare optical fiber featuring a polymer cover as its outermost layer, the hardness of the polymer covering layer can be measured as a dynamic hardness based on a diamond-tipped indentater pressed into the specimen (using an indentater with a regular triangular pyramid shape (edge distance=115°) in conjunction with a microcompression tester (Shimazu MCTE-500)) or a micro-Vickers hardness. As shown in FIG. 3, there is a near linear relationship between dynamic hardness or micro-Vickers hardness and Shore hardness D. Therefore, a Shore hardness D 55 or more, as an expression of the hardness level of the hard polymer comprising the polymer covering layer, is equivalent to a dynamic hardness or micro-Vickers hardness of 5 or more.

Preferably, the hard polymer comprising the polymer covering layer has a sufficiently higher refractive index than the quartz glass forming the cladding. In concrete terms, since the quartz used for the cladding generally has a refractive index of 1.458, it is preferable that the refractive index of the hard polymer be 1.50 or more. Any lower refractive index value is undesirable, as it would create different modes by generating reflections of the transmitted light on the inner surface of the polymer covering layer, thus reducing the bandwidth.

Preferably, the coefficient of linear expansion of the hard polymer is in the range of $0.6 \times 10^{-4}$–$2.0 \times 10^{-4}$/deg. If it is smaller than $0.6 \times 10^{-4}$, chipping tends to occur during fiber cutting or polishing, making it undesirable in view of obtaining clean-cut or polished surfaces. Conversely, if it is larger than $2.0 \times 10^{-4}$/deg, the microbend loss tends to be large.

The polymer covering layer made of this hard polymer needs to have a thickness of 5 μm or more, with 5–15 μm particularly desirable, to prevent the glass cladding or core from cracking or chipping during the installation of a crimp-type connector by crimping due to the stress concentration associated with it. Although the thicker the polymer covering layer, the greater its protective effects, it is desirable to keep it up to 15 μm, as too large a thickness would be likely to increase the microbend loss and axial misalignment of the polymer covering layer or core by forcing the cladding to become too thin to maintain a small overall diameter of 128 μm or less.

Since a crimp-type connector is attached to the fiber after removing the primary and secondary coatings with the polymer covering layer intact in this invention, it is preferable that high accuracy be maintained for the outer diameter and shape of the polymer covering layer in consideration of connector installation. For example, the deviation of its outer diameter and the circular deformation of its outer boundary circle should preferably be limited to ±6% or smaller and 4% or smaller, respectively, with ±3% or smaller and 2% or smaller particularly desirable.

The deviation of the outer diameter is the difference between the nominal value of the outer diameter of the polymer covering layer and its actual value as expressed in a percentage ratio to the nominal outer diameter. The circular deformation of the outer boundary circle of the polymer covering layer is the difference between the diameters of its circumscribed circle and inscribed circle as expressed in a percentage ratio to the diameter of a circle which best approximates the outer boundary of the polymer covering layer.

Therefore, it is preferable that the outer diameter of the polymer covering layer be kept at 128 μm or less, with 125±3 μm particularly desirable. Such a small diameter facilitates connection with existing GI quartz optical fibers, which conform to the standard outer diameter of 125±3 μm, and achieves compatibility with them. In other words, this makes it easy to ensure consistency and compatibility with existing GI quartz optical fibers.

The polymer covering layer described above can be produced using the method shown below.

On the heels of the GI quartz material drawing process for the quartz glass core and glass cladding, curable monomeric raw material for the hard polymer used as the polymer covering layer is applied onto the drawn preform, as the so-to-speak "proto-fiber", to a prescribed thickness and cured until the desired hardness and refractive index are obtained by subjecting it to ultraviolet radiation.

A primary coating is then provided over the polymer covering layer, with a secondary coating further provided over this. The primary coating is necessary to keep transmission loss down, in the event that the secondary coating loses flexibility in a low temperature region, for example 0°–40° C. The primary coating can be either single or multiilayered, but at least its innermost layer needs to consist of a soft polymer. If not, microbend loss would increase.

The soft polymer here can be any polymer with a Shore hardness of D 35 or less, with UV-cured acrylate or silicone resins used as primary coatings in existing GI quartz optical fibers suitable for this purpose. Outside the innermost layer of the primary coating, which consists of the above soft polymer, a harder polymer can be provided as the second layer of the primary coating. This polymer can be selected from hard polymer options available for the polymer covering layer as described above, and can be identical to the polymer covering layer. The outer diameter of the primary coating can be freely chosen according to the application, required characteristics, etc., but the suitable range is generally 250–500 μm.

Preferably, the hard polymer comprising the polymer covering layer and the soft polymer comprising the innermost layer of the primary coating are chosen from those whose glass transition temperatures fall outside the service temperature range of the optical fiber product produced from them. For example, where the allowable operating temperature range is set to –20°–60° C., it is preferable that the glass transition temperature of the hard polymer comprising the polymer covering layer and that of the soft polymer comprising the innermost layer of the primary coating be above 60° C. and below –20° C., respectively. Furthermore, where the primary coating consists of multiple layers, it is preferable that the second layer of the primary coating, provided just outside the innermost layer, which is made of a soft polymer, be a hard polymer that has a glass transition temperature of more than 60° C. Where the allowable operating temperature is set to –40°–80° C., the corresponding glass transition temperature requirements of polymers are above 80° C., below –40° C. and above 80° C.

The transmission loss of an optical fiber is generally higher at low temperatures, but the adverse effects of low temperatures, as well as those of alternating low and high temperatures, can be minimized by ensuring that the above glass transition temperature conditions are satisfied. This follows from the fact that the transmission loss characteristics of an optical fiber are believed to be adversely affected to a considerable degree by large changes in the hardness of polymers that take place as they enter the neighborhood of their glass transition temperatures and undergo transition from the rubber state to the glass state during cooling. Thus, the choice of polymers which do not have glass transition temperatures within the operating temperature range can help overcome such adverse effects.

The glass transition temperatures of polymers are measured using "TMA", a measuring instrument manufactured by Seiko Instruments, under the condition of 10° C./min.

A jacketed optical fiber unit may contain one or more optical fibers, and is produced by providing a secondary coating over a single primary-coated fiber, a pair of primary-coated fibers or three or more primary-coated fibers arranged in a ribbon formation. The secondary coating material can be freely chosen according to the application, required characteristics, etc., and options include a heat-resistant fluororesin, such as a tetrafluoroethylene-hexafluoropropylene compolymer, an ethylene-tetrafluoroethylene copolymer, polytetrafluoroethylene or tetrafluoroethylene-perfluoroalkylvinylether polymer; a polyamide resin, such as nylon-11 or -12; a polyimide resin; or a UV-cured resin.

To produce an optical fiber cord suitable for practical applications, a jacketed optical fiber is further provided with a polymer sheath to increase its tensile strength. To this end, measures such as inserting a high tensile material, e.g. a steel wire strand or aramid fiber, and forming a composite cable in conjunction with copper conductors can be taken.

As with existing jacketed GI optical fiber units or optical fiber cords, a connector is attached to a jacketed optical fiber or optical fiber cord pertaining to the present invention at one or both ends in practical applications, and it is preferable that such a connector be of the crimp-type, which allows adhesive-free installation.

Namely, in the case of a jacketed optical fiber unit, both primary and secondary coatings are removed at one or both ends where a connector is to be attached, with the polymer covering layer intact, and a crimp-type connector is then placed and fixed by crimping, followed by a standard fiber end preparation process, as necessary.

Thus, in this invention, a crimp-type connector is mounted onto the polymer covering layer, which is not removed, by crimping.

This allows quick assembly compared to the installation of an adhesive-type connector, while dramatically simplifying on-site connector mounting during the installation of jacketed optical fiber units or optical fiber cords, as adhesives are not required.

Although a sufficiently smooth surface can be obtained via stress rupture alone if hard polymers pertaining to this invention are used as polymer covering layers, polishing may be performed to further prepare the fiber end. End surface formation via stress rupture is advantageous in terms of convenience and simplicity, while that via polishing is advantageous in terms of connection loss reductions and reproducibility. End surface polishing can be either plane surface grinding or spherical surface grinding.

All physical data cited in the present invention is based on measurements obtained using the following methods:

Polymer Shore hardness D: This is measured using the D method under ASTM-D2240, based on a 1 mm-thick polymer plate specimen produced by curing the same monomeric raw material used for the production of the polymer covering layer under the same conditions. In the case of the soft polymer for the primary coating, too, a polymer plate specimen produced by curing the same monomeric raw material used for the formation of the primary coating under the same conditions can be employed.

Refractive index profile parameter 'α' of quartz glass core: The refractive index profile parameter 'α' is measured at practical wavelengths using the general method in which the interference patterns of a thin specimen, which is a sliced optical fiber piece, is measured using an interference microscope and the refractive index profile is calculated.

Average axial misalignment of optical fiber mounted with connector (μm): This is measured as the eccentricity of the circle formed by the outer boundary of the quartz glass cladding in terms of the distance between the center of this circle and that of the ferrule through microscopic observation, with the measurement carried out 10 times to take an average.

Ferrule crimping optical loss (dB): Taking a 3 m-long optical fiber specimen provided with a connector at one end without adhesion or crimping, the amount of transmitted light is first measured as the initial light volume using an 850 nm LED. A connector is mounted at the other end of the specimen by crimping while making adjustments so that the force required to pull the fiber out will be 2 kgf, and the amount of transmitted light is measured in the same manner as before. The difference between this reading and the initial light volume is then calculated, and the whole process is repeated three times, with the average of three measurements defined as the ferrule crimping optical loss.

Average mirror surface ratio of fiber end (%): After stress-rupturing the optical fiber specimen, the area of the mirror region on the core rupture surface is measured using an optical microscope, and the ratio of this area to the total sectional area of the core is calculated, with the measurement repeated 10 times and the average taken.

Working Examples

Although further explanation will be given below by way of working examples and comparative examples, the present invention is not limited to the implementation modes shown therein.

Example 1

To produce a graded index profile optical fiber with a core diameter of 62.5 μm and a cladding diameter of 125 μm, a quartz glass rod was fabricated by vitrifying the parent material of the GI quartz glass, manufactured using the vapor phase axial deposition method. This was then fed into a 2,200° C. furnace continuously, and drawn to 100 μm in cladding diameter to become the "photo-fiber" over which a polymer covering layer is provided. The core diameter was 50 μm.

Meanwhile, the monomeric raw material of a UV-cured fluoroacrylate resin with a Shore hardness of D77 and a refractive index of 1.460 when cured was passed through a 0.1 μm filter and fed into the coating die.

The monomeric raw material held in the coating die was applied over the surface of the drawn preform as the "photo-fiber", and cured by subjecting it to radiation from a UV lamp with a central frequency of 360 nm. This was then wound onto a bobbin via rollers at a constant speed, producing a bare optical fiber with a polymer covering layer diameter of 125 μm. This bare optical fiber had a numerical aperture (NA) of 0.20, a polymer covering layer outer boundary circle eccentricity of 1% and a circular deformation of 0.8%.

The bare optical fiber was given a two-layer primary coating consisting of two types of UV urethane acrylate resins (soft and hard) in such a manner that their monomeric raw materials were applied and cured to outer diameters of 250 μm and 400 μm, respectively. A secondary coating consisting of nylon-12 was then provided to bring the outer diameter to 900 μm via hotmelting to produce a jacketed optical fiber unit, which was further provided with a polymer sheath with an outer diameter of 4 mm to become a optical fiber cord. The produced optical fiber cord exhibited a transmission loss of 2.7 dB/km and a transmission bandwidth of 250 MHz×km at 850 nm, demonstrating its superiority in terms of both transmission loss and transmission bandwidth.

All the outer covering layers of the optical fiber cord right down to the primary coating were then removed at one or both ends, exposing the bare fiber with an outer diameter of 125 μm, and a PCF crimp-type connector, a modification of Toshiba Model TOCP101QK (for cladding diameter 230 μm) to suit a cladding diameter of 125 μm while maintaining the same construction, was mounted over the polymer covering layer. The fiber end protruding out of the connector was stress-ruptured using a fiber-cutter, thus exposing the fiber end surface.

The axial misalignment of the optical fiber mounted with a connector was small, 1.8 μm on average, and there was no damage to the fiber due to crimping, with a small ferrule crimping optical loss, 0.10 dB, and a high mirror area ratio, 82% on average, thus producing excellent results.

Examples 2–6 and Comparative Examples 1–5

An optical fiber cord was produced in the same manner as Example 1, except that the drawing conditions, and the type and coating conditions of the hard polymer were changed to those shown in Tables 1 and 2. Its performance with a crimp-type connector attached was then evaluated in the same way, with the results also shown in Tables 1 and 2.

TABLE 1

|  | Example 1 | Example 2 | Comparative Example 2 | Comparative Example 1 | Comparative Example 2 | Example 3 | Comparative Example 4 |
|---|---|---|---|---|---|---|---|
| Core diameter (μm) | 50 | 50 | 50 | 50 | 50 | 50 | 50 |
| Core refractive index profile parameter | 1.98 | 1.98 | 1.98 | 1.98 | 1.98 | 1.98 | 1.98 |
| Cladding diameter (μm) | 100 | 100 | 100 | 100 | 125 | 115 | 120 |
| Polymer covering layer outer diameter (μm) | 125 | 125 | 125 | 125 | 140 | 125 | 125 |
| Polymer covering layer thickness (μm) | 12.5 | 12.5 | 12.5 | 12.5 | 7.5 | 5 | 2.5 |
| Type of hard polymer comprising polymer covering layer | UV-cured fluororesin | UV-cured acrylate resin | UV-cured acrylate resin | Thermoplastic fluororesin | Thermoplastic fluororesin | UV-cured acrylate resin | UV-cured acrylate resin |
| Hardness of this hard polymer | D77 | D65 | D50 | D65 | D65 | D55 | D65 |
| Refractive index of this hard polymer | 1.460 | 1.520 | 1.514 | 1.490 | 1.490 | 1.524 | 1.520 |
| Coefficient of linear expansion of this hard polymer (×10$^{-4}$/deg) | 0.6 | 1.1 | 1.0 | 0.5 | 0.5 | 1.0 | 1.5 |
| Transmission loss (dB/km) | 2.7 | 2.6 | 2.6 | 4.3 | 3.1 | 2.5 | 2.4 |
| Transmission bandwidth (MHz × km) | 250 | 400 | 400 | 350 | 350 | 400 | 400 |
| Average axial misalignment (μm) | 1.8 | 3.5 | 6.5 | 1.9 | 2.2 | 1.9 | 0.9 |
| Presence of fiber damage due to crimping | not found | not found | not found | not found | not found | not found | not found |
| Ferrule crimping optical loss (dB) | 0.10 | 0.05 | 0.14 | 0.18 | 0.121 | 0.09 | 1.20 |
| Average mirror surface ratio (%) | 82 | 91 | 68 | 61 | 66 | 80 | 90 |

TABLE 2

|  | Comparative Example 5 | Example 4 | Example 5 | Example 6 |
| --- | --- | --- | --- | --- |
| Core diameter ($\mu$m) | 50 | 62.5 | 62.5 | 62.5 |
| Core refractive index profile parameter | 1.98 | 1.98 | 1.98 | 1.98 |
| Cladding diameter ($\mu$m) | 85 | 100 | 100 | 100 |
| Polymer covering layer outer diameter ($\mu$m) | 125 | 125 | 125 | 125 |
| Polymer covering layer thickness ($\mu$m) | 20 | 12.5 | 12.5 | 12.5 |
| Type of hard polymer comprising polymer covering layer | UV-cured acrylate resin | UV-cured fluororesin | UV-cured acrylate resin | UV-cured fluororesin |
| Hardness of this hard polymer | D40 | D77 | D65 | D70 |
| Refractive index of this hard polymer | 1.520 | 1.460 | 1.520 | 1.486 |
| Coefficient of linear expansion of this hard polymer ($\times 10^{-4}$/deg) | 1.1 | 0.6 | 1.1 | 2.1 |
| Transmission loss (dB/km) | 2.8 | 2.8 | 2.6 | 3.3 |
| Transmission bandwidth (MHz $\times$ km) | 400 | 250 | 400 | 300 |
| Average axial misalignment ($\mu$m) | 8.5 | 2.0 | 3.2 | 3.5 |
| Presence of fiber damage due to crimping | not found | not found | not found | not found |
| Ferrule crimping optical loss (dB) | 0.25 | 0.11 | 0.05 | 0.13 |
| Average mirror surface ratio (%) | 60 | 78 | 91 | 92 |

As shown in Tables 1 and 2, Examples 2–6 exhibited superior transmission loss and bandwidth characteristics, a accurate axial alignment accuracy, no optical fiber damage associated with connector mounting and a low crimping optical loss, as well as very smooth mirror-finish fiber end surface as in the case of Example 1.

In contrast, Comparative Examples 1 and 5 exhibited a large axial misalignment due to a low Shore hardness of the hard polymer, as well as a low mirror surface ratio. On the other hand, both Comparative Examples 2 and 3, in which a thermoplastic fluoroacrylate resin was used, exhibited a low mirror surface ratio, while the transmission loss and crimping loss were acceptable with Comparative Example 3, featuring a cladding diameter of 125 $\mu$m and a polymer covering layer diameter 140 $\mu$m, but deteriorated with Comparative Examples 2, featuring a cladding diameter of 100 $\mu$m and a polymer covering layer diameter of 125 $\mu$m, which were much less than in Example 3. In the case of Comparative Example 4, crimping-related fiber damage could not be prevented due to too thin a polymer covering layer thickness, while crimping loss was also large.

Working Example 7 and Comparative Example 6

Low temperature characteristics tests were conducted on the optical fiber cord produced in Example 2 and another optical fiber cord produced in the same manner as Comparative Example 1, except that the soft polymer in the inner layer of the primary coating was changed to one which had a glass transition temperature of $-14°$ C.

Low temperature characteristics test: Taking a 500 m-long optical fiber cord, an 850 LED was connected at one end and a power meter at the other. Its 498 m-long middle section was then immersed in a thermostatic chamber, and a heat cycle test, in which a 2-hour cycle of alternating low and high temperatures was repeated 100 times in the manner "$-20°$ C.$\rightarrow 60°$ C.$\rightarrow -20°$ C.$\rightarrow 60°$ C.$\rightarrow$", with resulting changes in transmission loss measured over time.

Figure 4:
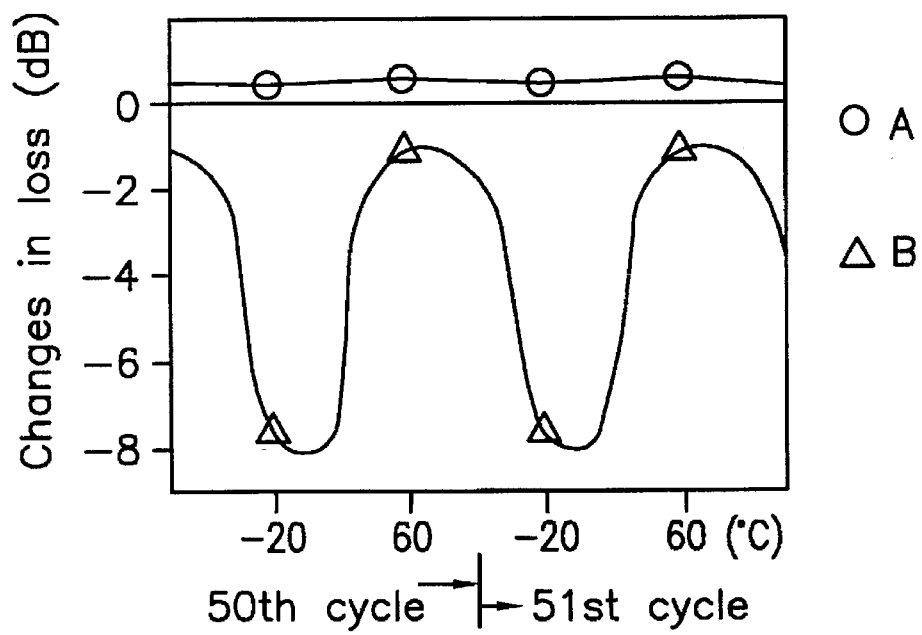
FIG. 4 is a graph plotting the results of low temperature characteristics tests (heat cycle tests) in Working Example 7 and Comparative Example 6, showing changes in transmission loss over time.

The results of the low temperature characteristics tests are shown in FIG. 4, in which the ordinate axis represents changes in transmission loss relative to the value measured at the beginning of the test, with negative figures signifying deterioration. Measurement results of various physical quantities are shown in Table 3.

As can be seen from FIG. 4 and Table 3, Example 7, in which polymers used for the polymer covering layer and the soft polymer inner layer of the primary coating had their glass transition temperatures kept within suitable ranges, exhibited excellent transmission characteristics even at low temperatures, with minor adverse effects of temperature changes observed. In contrast, Comparative Example 6, in which polymers used for the polymer covering layer and the soft polymer inner layer of the primary coating had their glass transition temperatures outside suitable ranges, exhibited poor transmission characteristics, particularly at low temperatures, due to the considerable adverse effects of temperature changes.

As in the case of Comparative Example 2, Comparative Example 6 also performed poorly in terms of crimping loss associated with connector installation, etc., because the hardness of the hard polymer used for the polymer covering layer was too low.

TABLE 3

|  | Example 7 | Comparative Example 6 |
| --- | --- | --- |
| Core diameter ($\mu$m) | 50 | 50 |
| Core refractive index profile parameter | 1.98 | 1.98 |
| Cladding diameter ($\mu$m) | 100 | 100 |
| Polymer covering layer outer diameter ($\mu$m) | 125 | 125 |
| Polymer covering layer thickness ($\mu$m) | 12.5 | 12.5 |
| Type of hard polymer comprising polymer covering layer | UV-cured acrylate resin | UV-cured acrylate resin |
| Hardness of this hard polymer | D65 | D50 |
| Glass transition temperature of this polymer (°C.) | 86 | 45 |
| Glass transition temperature of inner layer soft polymer of primary coating (°C.) | −40 | −14 |

TABLE 3-continued

|  | Example 7 | Comparative Example 6 |
| --- | --- | --- |
| Glass transition temperature of outer layer hard polymer of primary coating (°C.) | 104 | 104 |
| Transmission loss (dB/km) | 2.6 | 2.6 |
| Low temperature characteristics | FIG. 4 "A" | FIG. 4 "B" |

We claim:

1. A broad bandwidth optical fiber comprising a quartz glass core with a graded index profile, a quartz glass cladding provided over said core and a polymer covering layer provided over said cladding, with said polymer covering layer made of a UV-cured hard polymer with a Shore hardness of D 55 or greater and at least 5 μm thick.

2. A broad bandwidth optical fiber as claimed in claim 1, in which the outer diameter of the polymer covering layer is 128 μm or more.

3. A broad bandwidth optical fiber as claimed in claim 1, in which the hard polymer is a UV-cured acrylate resin without containing fluorine atoms and with a refractive index of 1.50 or more.

4. A broad bandwidth optical fiber as claimed in claim 1, in which the thickness of the polymer covering layer is in the 5–15 μm range.

5. A broad bandwidth optical fiber as claimed in claim 1, in which the coefficient of linear expansion of the hard polymer is in the $0.6 \times 10^{-4}$–$2.0 \times 10^{-4}$/deg range.

6. A broad bandwidth optical fiber as claimed in claim 1, in which the refractive index profile parameter 'a' of the core is in the 1.8–2.2 range.

7. A broad bandwidth optical fiber as claimed in claim 1, in which the numerical aperture (NA), which is calculated using the formula "NA=$(n_1^2-n_2^2)^{1/2}$", where $n_1$ is the maximum refractive index of the core and $n_2$ is the refractive index of the cladding, is 0.30 or less.

8. A broad bandwidth optical fiber as claimed in claim 7, in which the numerical aperture (NA) is in the 0.18–0.29 range.

9. A broad bandwidth optical fiber as claimed in claim 1, in which the deviation and circular deformation of the outer boundary circle of the polymer covering layer are ±6% or smaller and 4% or smaller, respectively.

10. A broad bandwidth optical fiber as claimed in claim 2, in which the core diameter and cladding outer diameter are 65.5 μm or less and 118 μm or less, respectively.

11. A broad bandwidth optical fiber as claimed in claim 10, in which the core diameter, cladding outer diameter and polymer covering layer outer diameter are 50±3 μm or 62.5±3 μm, 97–118 μm and 125±3 μm, respectively.

12. A jacketed broad bandwidth optical fiber unit comprising one or more optical fibers with polymer covering layer as claimed in claim 1, a primary coating consisting of one or more or layers and formed over the polymer covering layer, and a secondary coating provided over the primary-coated fiber or fibers, with at least the innermost layer of the primary coating being a soft polymer.

13. A jacketed broad bandwidth optical fiber unit as claimed in claim 12, in which the Shore hardness of the soft polymer comprising the innermost layer of the primary coating is D35 or less.

14. A jacketed broad bandwidth optical fiber unit as claimed in claim 12, in which the glass transition temperatures of the hard polymer comprising the polymer covering layer and that of the soft polymer comprising the innermost layer of the primary coating are 60° C. or more and –20° C. or less, respectively.

15. A broad bandwidth optical fiber cord produced by providing a polymer sheath around the jacketed broad bandwidth optical fiber unit as claimed in claim 12.

16. A connector-attached jacketed optical fiber unit cord produced by mounting a crimp-type connector onto one or both end of the jacketed broad bandwidth optical fiber unit as claimed in claim 12 after removing the primary and secondary coatings, with the polymer covering layer intact.

17. A connector-attached optical fiber cord produced by mounting a crimp-type connector to one or both end of the broad bandwidth optical fiber cord as claimed in claim 15 after removing the primary and secondary coatings and polymer sheath, with the polymer covering layer intact.

* * * * *